United States Patent [19]

Walz

[11] Patent Number: 4,795,787
[45] Date of Patent: * Jan. 3, 1989

[54] CURING COMPONENT FOR SYNTHETIC RESINS WHICH CONTAIN GROUPS CAPABLE OF AMIDE FORMATION OR ESTER FORMATION WITH CARBOXYLIC ACIDS

[75] Inventor: Gerd Walz, Wiesbaden, Fed. Rep. of Germany

[73] Assignee: Hoechst AG, Fed. Rep. of Germany

[ * ] Notice: The portion of the term of this patent subsequent to Feb. 17, 2004 has been disclaimed.

[21] Appl. No.: 105,652

[22] Filed: Oct. 5, 1987

Related U.S. Application Data

[63] Continuation-in-part of Ser. No. 732,493, May 9, 1985, abandoned.

[30] Foreign Application Priority Data

May 11, 1984 [DE] Fed. Rep. of Germany ....... 3417441

[51] Int. Cl.$^4$ .................. C08G 59/14; C09D 5/44; C08F 8/14
[52] U.S. Cl. .................. 525/328.2; 523/414; 523/402; 525/328.8; 525/329.7; 525/330.6; 525/374; 525/386; 525/523; 525/533; 528/92; 528/106; 528/119; 528/121; 204/181.7
[58] Field of Search .............. 523/414, 402; 528/106, 528/92, 119, 121, 361, 369, 365; 525/328.2, 329.7, 330.6, 374, 386, 328.8, 330.1, 523, 533

[56] References Cited

U.S. PATENT DOCUMENTS

| | | | |
|---|---|---|---|
| Re. 31,022 | 8/1982 | Buchwalter et al. | 523/415 X |
| 4,198,331 | 4/1980 | Buchwalter et al. | 528/121 X |
| 4,458,054 | 7/1984 | Schmözer et al. | 528/121 X |
| 4,544,715 | 10/1985 | Paar et al. | 523/415 X |
| 4,644,036 | 2/1987 | Walz et al. | 528/121 X |
| 4,704,437 | 11/1987 | Kiessling | 528/121 X |

*Primary Examiner*—Earl Nielsen
*Attorney, Agent, or Firm*—Bierman & Muserlian

[57] ABSTRACT

Novel curing agents for synthetic resins containing groups capable of ester formation or amide formation and, optionally polymerizable double bonds which are Michael addition products of monocarboxylic or dicarboxylic acid esters, capable of undergoing Michael addition, with compounds containing at least two double bonds capable of undergoing Michael addition, the two components being reacted in such ratios that the Michael addition product contains at least one ester group capable of transesterification and/or transamidation and at least one polymerizable double bond.

18 Claims, No Drawings

CURING COMPONENT FOR SYNTHETIC RESINS WHICH CONTAIN GROUPS CAPABLE OF AMIDE FORMATION OR ESTER FORMATION WITH CARBOXYLIC ACIDS

This is a continuation-in-part-application of application Ser. No. 732,493 filed on May 9, 1985 by G. Waltz, now abandoned.

An earlier German patent application P 3,315,469.4 relates to curing agents for synthetic resins which contain groups capable of amide formation and/or ester formation with carboxylic acids. These curing agents are Michael addition products of monocarboxylic or dicarboxylic acid esters, capable of undergoing Michael addition, with compounds containing at least one double bond capable of undergoing Michael addition. They contain, on average, at least two ester groups per molecule which are capable of tansesterification or transamidation.

These curing agents are distinguished by the fact that they react, with crosslinking, even at relatively low temperatures of about 160° C. with synthetic resins capable of ester formation or amide formation, and that the cleavage products thus formed cause little environmental pollution, above all if the ester groups capable of transesterification or transamidation contain, as the alcohol component, lower alcohols, in particular ethanol.

However, it is of considerable interest to reduce further the cleavage losses in the curing of paint films, while maintaining the same density of crosslinking, in order firstly to cause even less pollution to the exit air and secondly to keep the material employed in the paint film to the maximum extent possible.

The curing component for synthetic resins which contain groups capable of amide formation and/or ester formation with a carboxylic acid is composed, in accordance with the invention, of the Michael addition product of a monocarboxylic or dicarboxylic acid ester, capable of undergoing Michael addition, with a compound containing at least two double bonds capable of undergoing Michael addition, the Michael addition product containing, on average, at least one ester group capable of transesterification and/or transamidation and at least one polymerizable double bond per molecule. The content of these polymerizable double bonds is usually at least 2.1% by weight, preferably 2.1 to 9% by weight.

Compounds containing double bonds capable of undergoing Michael addition are, in principle, all $\alpha,\beta$-unsaturated oxo compounds, such as $\alpha,\beta$-unsaturated aldehydes and ketones. Compounds containing double bonds capable of undergoing Michael addition which are preferably used in accordance with the invention are the esters, amides and urea derivatives of $\alpha,\beta$-unsaturated monocarboxylic or dicarboxylic acids, in particular the esters, amides and urea derivatives of acrylic acid, methacrylic acid, dimethylacrylic acid, crotonic acid, maleic acid and fumaric acid.

Monocarboxylic or dicarboxylic acid esters capable of undergoing Michael addition which are used in accordance with the invention are, in particular, the esters of malonic acid, acetoacetic acid, cyanoacetic acid and acetonedicarboxylic acid, which can also be substituted by an alkyl radical on the acid methylene groups. Esters of cyanoacetic acid have proved to be particularly suitable for the curing component according to the invention.

Possible esterification components are preferably linear or branched alkanols containing, preferably, 1 to 8 carbon atoms, especially methanol and ethanol. It can be advantageous if the esterification component is composed in part of a branched alkanol, especially 2-ethylhexanol, since this makes it possible in some cases to counteract the tendency of a paint film to form craters when stoved. The methyl and ethyl esters produce particularly low stoving temperatures and low cleavage products which are, in addition, particularly harmless.

A large number of compounds which are Michael addition products of monocarboxylic or dicarboxylic acid esters, capable of undergoing Michael addition, with compounds containing at least two double bonds capable of undergoing Michael addition, are suitable as the curing component according to the invention. As a result of the Michael addition of unsaturated compounds of a relatively low molecular weight with the said monocarboxylic or dicarboxylic acid esters, compounds are formed having a sufficiently low vapor pressure under stoving conditions for the esters not to escape from the paint film to be cured. Surprisingly, however, the susceptibility to hydrolysis of the esters is also drastically reduced thereby, so that they can be employed as a curing component in aqueous systems for electrophoretic coating. A further surprising fact was that the crosslinking with the curing components according to the invention also takes place via reactions of the double bond at comparatively low temperatures.

In one embodiment of the invention, the curing component is a Michael addition product of a monocarboxylic or dicarboxylic acid ester, capable of undergoing Michael addition, with an ester of an $\alpha,\beta$-unsaturated monocarboxylic or dicarboxylic acid with a polyol which preferably contains 2 to 4 hydroxyl groups.

In particular, the ester of the $\alpha,\beta$-unsaturated acid can be selected from the group comprising alkanediol diacrylates or dimethacrylates, trimethylolpropane triacrylate or trimethacrylate and pentaerythritol tetraacrylate or tetramethacrylate. These esters are readily accessible commercial products.

Another group of curing components which have a particularly advantageous effect on the adhesion to sheet steel of paint films cured therewith and on the adhesion of coatings based on PVC to the cured paint film, embraces Michael addition products which constitute substituted urethanes or ureas of the general formula

$$(Ac-B-A)_n - R_{m+n}(A-B-Ac'M)_m \qquad (I)$$

in which the individual symbols have the following meaning $R_{m+n}$ is the (m+n)-valent radical $R(NHCO)_{m+n}$ of a polyfunctional isocyanate, m is an integer, at least 1, preferably 1 to 4, n is an integer, at least 1, preferably 1 to 4, A is a chemical bond or an aminoalkylene, an O-alkylene, an aminocycloalkylene or an O-cycloalkylene radical, B is an amino group or an oxygen atom, Ac is the acyl radical

of an α,β-unsaturated monocarboxylic or dicarboxylic acid,

Ac' is identical to Ac, however with the exception that Ac' is not unsaturated due to the Michael addition of M, and M is the ester of a monocarboxylic or dicarboxylic acid, which is attached to the molecule by Michael addition, subject to the proviso that the molecule contains at least one polymerizable double bond and at least one ester group from the carboxylic acid ester (M) capable of undergoing Michael addition, and that B is an amino group if A is a chemical bond.

In the above formula (I) m+n is preferably 2 to 6, especially 2 to 4.

In an advantageous modification of the curing component described above in formula (I), A is a radical of the formula

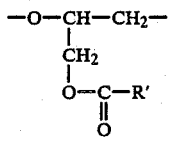 (II)

in which R' is an alkyl radical which has 9-11 carbon atoms and is branched in the α-position relative to the carboxyl group, and B in formula (I) is an oxygen atom.

Paint films containing compounds having radicals of the above formula (II) frequently have less tendency to cratering during stoving and display advantageous anticorrosion properties.

In a further advantageous modification of the curing component according to (I), A is a radical derived from a 1,2-diol containing at least 5 carbon atoms in an unbranched chain and B is an oxygen atom. The corresponding starting compound Ac—A—OH is obtained, for example, by reacting a 1,2-alkene oxide with an α,β-unsaturated monocarboxylic or dicarboxylic acid. Depending on the chain length of the 1,2-diol, the curing components thus synthesized have the property of plasticizing the paint film when it is deposited by electrophoresis, as a result of which it is possible to achieve thicker layers of paint. As a rule, it is sufficient if only part of the curing components is composed of a plasticizing compound of this type.

A similar effect is shown by curing components in which A in formula (I) has the structure

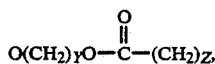

B is an oxygen atom, Y is an integer, preferably 2, and Z is an integer, at least 5. The corresponding starting compound

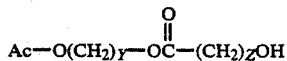

is obtained, for example, by an addition reaction of a hydroxyalkyl ester of an α,β-unsaturated carboxylic acid with a lactone. The reaction product from hydroxyethyl acrylate and ε-caprolactone is a typical, commercial available representative of this class of compounds.

Curing components according to the invention, containing, as a constituent of the molecule, the glycerol ester of a carboxylic acid which has 9-11 carbon atoms and is branched in the α-position are obtained by preparing an unsaturated mixed ester for an α,β-unsaturated dicarboxylic acid, a diol and the glycidyl ester of a carboxylic acid which has 9-11 carbon atoms and is branched in the α-position, and carrying out an addition reaction between this mixed ester and a monocarboxylic or dicarboxylic acid ester which is capable of undergoing Michael addition to an extent such that polymerizable double bonds still remain in the molecule.

A further class of curing components according to the invention comprises the Michael addition products of monocarboxylic or dicarboxylic acid esters, capable of undergoing Michael addition, with amides of α,β-unsaturated monocarboxylic or dicarboxylic acids, for example with methylenebisacrylamide, toluylenebisacryl-amide or hexamethylenebisacrylamide or isophorone-bisacrylamide.

The curing agents according to the invention can be used in two-component lacquers together with a synthetic resin capable of amide formation and/or ester formation with carboxylic acids. Synthetic resins which furthermore contain polymerizable double bonds are also suitable.

Synthetic resins which can be cured at elevated temperatures by means of the curing component according to the invention are compounds known per se which have molecular weights of about 300 to about 20,000 and which contain groups capable of ester formation or amide formation. These are, for example, polymers of olefinically unsaturated monomers containing, as a constituent, hydroxy esters and/or amino esters of olefinically unsaturated acids, such as aminoalkyl acrylates or hydroxyalkyl acrylates, or the corresponding methacrylates. A further group is constituted by the polyaminoamides which can be obtained from dimerized fatty acids and polyamines. Amino-polyether-polyols are obtained, for example, by reacting epoxy resins formed from polyphenols and epihalogenohydrins with primary and/or secondary amines.

Synthetic resins containing carboxylic acid or amino groups can frequently be rendered water-soluble by means of bases or acids and can be deposited anodically or cathodically from such solutions. By virtue of their resistance to hydrolysis, the curing components according to the invention are particularly suitable for use as a constituent of such electrophoretic paints. Particularly good results are obtained in conjunction with cationic amino-polyether-polyols.

The amine-containing and/or hydroxyl-containing synthetic resins are cured by transamidation and/or transesterification at elevated temperatures with the ester groups introduced by Michael addition and by crosslinking reactions of the polymerizable double bonds, the temperature required depending on the alcohol component of these esters and being correspondingly lower, the lower the molecular weight of the alcohol component. Particularly low curing temperatures are therefore obtained with the methyl and ethyl esters. Curing temperatures of about 140°-160° C. can be achieved by adding catalysts which accelerate the transesterification or transamidation. Higher temperatures up to about 250° C. are possible. Examples of suitable catalysts are metal salts of organic acids, in particular zinc, lead, iron or chromium octoate or zinc, lead, iron or chromium naphthenate. These catalysts also accelerate the crosslinking reactions of the double bonds contained in the curing agent molecule.

The synthetic resin and the curing agent are mixed in such proportions that the ratio of the total number of moles of groups capable of ester formation and amide formation in the synthetic resin to the total number of moles of double bonds and groups capable of transesterification and transamidation in the curing agent is 0.1–10, preferably 0.3–3.

The amount of catalyst used to accelerate the curing process is between 0 and 10%, calculated as amount of metal by weight and relative to the total weight of the synthetic resin and the curing agent.

The preparation of the curing components according to the invention is effected by methods known per se.

In principle, the Michael addition reaction takes place at room temperature or even below. It can be accelerated by increasing the temperature and by adding catalysts. Suitable catalysts are basic compounds, such as alkali metal hydroxides, alkali metal alcoholates and basic amino compounds.

The carboxylic acid ester which is capable of undergoing Michael addition can be monosubstituted on the CH-acidic methylene group. In this case monoaddition products are obtained with $\alpha,\beta$-unsaturated carbonyl compounds, in particular carboxylic acid derivatives. If the said carboxylic acid ester contains an unsubstituted CH-acidic methylene group, oligomeric adducts can be obtained in which both acidic H atoms undergo a Michael addition with an $\alpha,\beta$-unsaturated carbonyl compound. The molecular weight and the functionality of the curing agents and the distribution within the molecule of the curing agent of ester groups capable of undergoing transesterification or transamidation and of the polymerizable double bonds can be varied and adapted to suit particular requirements by this means too.

Curing components which contain urethane or urea groups and which correspond to the formula I are obtained by reacting hydroxy esters, hydroxy amides, amides, aminoesters or amino amides of $\alpha,\beta$-unsaturated acids with isocyanates and by subsequent Michael addition reaction with a monocarboxylic or dicarboxylic acid ester capable of undergoing Michael addition. Possible isocyanates for this reaction can be, above all, the substances which are available on a large industrial scale, such as toluylene diisocyanate, hexamethylene diisocyanate and isophorone diisocyanate. The formation of the urea or urethane takes place in general at moderate temperatures and can be accelerated by means of known catalysts, for example dibutyltin dilaurate. If the reaction is to be carried out in a solvent, a solvent which is inert towards isocyanates is selected, and, for the preparation of curing components which are intended to be employed in aqueous systems, it is preferable to select a water-miscible solvent, such as diethylene glycol dimethyl ether, acetone, methyl ethyl ketone or methyl isobutyl ketone.

Curing components containing amido groups are obtained if the free $\alpha,\beta$-unsaturated acid is employed instead of an ester or amide. In this case the corresponding amide is formed directly from the acid and the isoyanate with decarboxylation.

In the present description, the curing components according to the invention have been represented as unitary chemical individuals. In practice, statistical mixtures are frequently formed, because of the polyfunctionality of the starting materials. This does not affect their usability as curing agents according to the invention.

In the examples which follow, parts are parts by weight and percentages (%) are percentages by weight.

EXAMPLES

I. Preparation of the curing agents (1) 4.5 parts of methyl cyanoacetate and 0.4 part of benzyltrimethylammonium hydroxide were initially placed in a reactor and heated to 60° C., 226.3 parts of hexanediol diacrylate were then added dropwise and the reaction mixture was kept at 60° C. until the content of —C=C— double bonds was 8.5%. 0.5 part of formic acid and 1.5 parts of hydroquinone monomethyl ether were then added. A viscous, pale yellow liquid was obtained.

(2) (Pre-product) 2,160 parts of hydroxyethyl acrylate having an acid number of <1, 3.8 parts of zinc acetylacetonate and 422 parts of diglycol dimethyl ether were initially placed in a reactor and heated to 60° C., 1636 parts of toluylene diisocyanate were added dropwise slowly and the mixture was kept at 60° C. until the content of —N=C=O groupings was less than 0.2%. 15 parts of hydroquinone and 422 parts of ethylene glycol were then added. An 80% strength, clear, viscous resin having a double bond content of 9.5%, relative to the solution, was obtained.

1016 parts of 80% strength pre-product and 10 parts of KOH, as a 30% strength solution in methanol, were initially placed in a reactor and heated to 80° C. and 132 parts of dimethyl malonate were added dropwise slowly at such a rate that a temperature of 80° C. was not exceeded. The mixture was kept at 80° C. until the content of —C=C— double bonds had fallen to 4.2%. The reaction mixture was diluted with ethylglycol to a solids content of 80%, and 2 parts of glacial acetic acid were added. A viscous, yellowish resin was obtained.

(3) 260 parts of ethyl acetoacetate, 3 parts of KOH, as a 30% strength solution in methanol, and 50 parts of ethylglycol were initially taken and heated to 60° C. 678 parts of hexanediol diacrylate were then added dropwise slowly and the reaction temperature was kept at 60° C. until the content of —C=C— double bonds was 4.7%. 1 part of formic acid and 2 parts of hydroquinone were then added, and the solids content was adjusted to 80% with ethylglycol. A low-viscosity, yellow resin was obtained.

(4) (Pre-product) 520 parts of the glycidyl ester of a saturated fatty acid, branched in the $\alpha$-position and having 9–11 carbon atoms and an epoxide equivalent weight of 260, 130 parts of acrylic acid, 1 part of chromium-III octoate (dehydrated) and 1 part of hydroquinone monomethyl ether were heated in a reactor at 80° C. until the acid number was <1. 1 part of zinc acetylacetonate was then added and 175 parts of toluylene diisocyanate were added dropwise slowly at 60° C. and the mixture was kept at 60° C. until the —N=C=O content was <0.5%. A further 3 parts of hydroquinone monomethyl ether were then added.

10 parts of tetrabutylammonium hydroxide and 828 parts of pre-product were initially placed in a reactor and heated to 60° C.; 70 parts of butyl cyanoacetate were added dropwise slowly and the mixture was kept at 60° C. until the —C=C— content was 2.7%. 3 parts of hydroquinone and 2 parts of lactic acid were then added, and the batch was diluted with butylglycol to a solids content of 80%. A greenish, moderately viscous resin was obtained.

(5) (Pre-product) 370 parts of the diglycidyl ether of bisphenol A, epoxide equivalent weight 185, and 1 part of Cr-(III) octoate (dehydrated) were initially placed in a reactor and heated to 60° C. 140 parts of acrylic acid were then added dropwise slowly and the reaction mixture was kept at 60° C. until the acid number had fallen below.

510 parts of pre-product, 3 parts of KOH, as a 30% strength solution in methanol, and 100 parts of ethylglycol were initially placed in a reactor and heated to 60° C., 115 parts of 2-ethylhexyl acetoacetate were then added dropwise and the mixture was kept at 60° C. until the content of —C=C— double bonds was 3.3%. 3 parts of formic acid and 7 parts of hydroquinone were then added and the mixture was then diluted with ethylglycol to a solids content of 80%.

(6) 300 parts of trimethylolpropane triacrylate and 3 parts of KOH, as a 30% strength solution in methanol, were initially placed in a reactor and heated to 60° C. 540 parts of 2-ethylhexyl acetoacetate were then added dropwise and the mixture was reacted at 60° C. until the presence of double bonds could no longer be detected by titration. 1526 parts of 80% strength pre-product from Example 2 were then metered in at 60° C. and the mixture was reacted until the content of —C=C— double bonds was 3.0%. 10 parts of formic acid and 10 parts of hydroquinone were added, and the mixture was diluted with diglycol dimethyl ether to a solids content of 80%, a yellow, highly viscous resin being obtained.

(7) 230 parts of hydroxyethyl acrylate having an acid number <1, 160 parts of diethyl malonate and 1 part of benzyltrimethylammonium hydroxide were carefully heated at 60° C. in the reactor (No. 1) until the content of —C=C— double bonds was 0.5%.

At the same time, 350 parts of toluylene diisocyanate, 230 parts of hydroxyethyl acrylate and 2 parts of zinc acetylacetonate were heated to 60° C. in a second reactor (No. 2) and were reacted until only half of the free isocyanate groups could be detected. The reaction mixture produced in reactor (2) was then metered carefully at 60° C. into the reaction mixture from reactor (1) and the reaction was continued until no further free —N=C=O groups could be detected by titration. 4 parts of formic acid and 10 parts of hydroquinone were then added and the mixture was diluted with ethylglycol to a solids content of 80%. A very highly viscous, yellow resin was obtained.

(8) 696 parts of methyl acetoacetate, 1582 parts of hexanediol diacrylate and 3 parts of benzyltrimethylammonium hydroxide were heated carefully to 60° C. and reacted until the content of —C=C— double bonds was 2.1%. 2 parts of formic acid and 10 parts of hydroquinone monomethyl ether were then added and the mixture was then diluted with ethylglycol to a solids content of 80%. A very highly viscous, brownish solution was obtained.

(9) 1016 parts of 80% strength pre-product from Example 2 and 200 parts of polyepoxide-amine adduct A, as a 70% strength solution in ethylglycol (see below), as a catalyst, were initially placed in a reactor, and 132 parts of dimethyl malonate were then added dropwise slowly at such a rate that the temperature did not exceed 60° C., and the mixture was then kept at 60° C. until the content of —C=C— double bonds had fallen to 3.6%. The reaction mixture was diluted with ethylglycol to a solids content of 80%, and 1.8 parts of glacial acetic acid were added. A highly viscous, brownish resin was obtained.

II. Preparation of the amine-containing polymers

Polyepoxide-amine adduct A

| | |
|---|---|
| 3.6 parts of dimethylaminopropylamine | |
| 16.1 parts of 2-ethylhexylamine | Mixture I |
| 79.2 parts of ethyleneglycol monoethyl ether | |

Mixture I was heated to gentle reflux at a temperature of approx. 143° C. in a 2 l flask equipped with a reflux condenser, a stirrer and electrical resistance heating.

317 parts of bisphenol A epoxy resin having an epoxide equivalent weight of 480 were dissolved in 136 parts of ethyleneglycol monoethyl ether, and the mixture was added dropwise slowly, at 143° C., to Mixture I in the course of one hour. 130 parts of epoxidized soya oil having an epoxide equivalent of 260 were then added dropwise at 143° C. in the course of one hour, and the mixture was then kept at 142° C. for a further 10 hours. A 70% strength solution of an epoxide-amine adduct in ethylene glycol monoethyl ether was obtained.

Polyepoxide-amine adduct B 683 parts of a bisphenol A epoxide resin having an equivalent weight of 480 were dissolved in 339 parts of ethyleneglycol, and the solution was heated to 80° C. 50.4 parts of diethanolamine and 57.8 parts of diisopropylaminoethylamine were then added dropwise simultaneously. The reaction mixture was kept at 80° C. for 3 hours.

Amine adduct C

A polyaminoamide was prepared by known methods from dimeric fatty acids and diethylenetriamine in such a way that the polyaminoamide formed had the following characteristic data: solids content: 100%, amine number: 300, acid number: approx. 2, viscosity (75° C.): 3500 mPa.s.

The polyaminoamide was dissolved in dimethyldiethylene glycol to give a 70% solution.

III. Curing the resins 300 parts of titanium dioxide and 50 parts of lead silicate were added to 100 parts of a 70% strength solution of the basic polymer A. The mixture was ground on a triple roll mill. A similar process was also carried out with the basic polymers B and C.

The composition of the electrophoresis baths, the curing conditions and the properties of the cured products can be seen in Table 1 below.

The electrophoresis baths were prepared by first homogenizing the amount indicated in each case in Table 1 of the pigmented basic polymer A, B or C with the amount, also indicated, of curing agent and catalyst and also formic acid, using a high-speed stirrer, and then slowly adding deionized water until the solids content of the electrophoresis bath was approx. 19%.

The electrophoretic deposition was carried out by running the 19% strength electrophoresis liquors into a plastic tank equipped with a stainless steel anode and a metal sheet having a bonderized layer of zinc phosphate connected as the cathode and the deposition was carried out by applying, for 2 minutes, a direct voltage which was in each case 50 volts less than the rupture voltage. The layer thickness of the films deposited was regulated by adding ethylene glycol monohexyl ether to the electrophoresis baths so that the stoved films had a layer thickness of between 18 and 25 μm. The deposited films were rinsed with demineralized water and then stoved as indicated in Table 1. The metal sheets thus coated had the paint technological properties shown in Table 1.

with vigorous stirring into water at 50° C. to which formic acid had been added. The formic acid content was such that an MEQ of 50, relative to solid resin, was obtained. The solids content was 35%. This 35% strength, highly turbid solution in water was pigmented by known methods with titanium dioxide and basic lead silicate so that the pigment/binder ratio was 0.4:1 and the ratio of lead silicate to titanium dioxide was 1:6. The pigmented solution was then adjusted to a solids content TABLE 1
The paint technological properties of deposited and stoved electrophoresis baths.

| Use example No. | Pigmented basic resin Amount of A | Pigmented basic resin Amount of B | MEQ+ | Curing agent from: Example | Curing agent from: Amount, parts | Lead octoate, metal content 24%, parts | Zinc octoate, metal content 8%, parts | Baking conditions, minutes/°C. | Erichsen indentation, mm | Corrosion test as specified in ASTM B 117/6 (time elapsed for 2 mm sub-surface corrosion at the cross rule), hours |
|---|---|---|---|---|---|---|---|---|---|---|
| 10 | 1350 | — | 40 | 1 | 200 | 30 | — | 20/160° | 8.3 | >600 |
| 11 | 1350 | — | 35 | 2 | 295 | 30 | — | 20/150° | 7.6 | >650 |
| 12 | 1350 | — | 40 | 3 | 180 | — | 35 | 20/170° | 8.2 | >500 |
| 13 | 1350 | — | 40 | 4 | 350 | 30 | — | 20/160° | 9.5 | >600 |
| 14 | 1350 | — | 40 | 5 | 400 | 30 | — | 20/160° | 8.2 | >500 |
| 15 | 1350 | — | 35 | 7 | 290 | 35 | 10 | 20/140° | 8.3 | >500 |
| 16 | 1350 | — | 40 | 1 | 220 | 50 | 10 | 10/160° | 8.1 | >600 |
| 17 | — | 1350 | 60 | 7 | 280 | 30 | — | 20/160° | 8.5 | >650 |
| 18 | — | 1350 | 55 | 9 | 250 | 40 | 20 | 20/140° | 7.6 | >600 |
| 19 | 1350 | Parts of amine adduct C | 60 | 5 | 280 | — | 30 | 20/170° | 7.5 | >500 |

MEQ+ = milliequivalents of formic acid per 100 parts of binder solids

(20) 260 parts of dodec-1-ene oxide, 90 parts of acrylic acid, 1 part of dehydrated chromium-III octoate and 0.3 part of hydroquinone monomethyl ether were heated carefully at 80° C. in a reactor until the acid number was <1. 1047.3 parts of hydroxyethyl acrylate and 2.3 parts of zinc acetylacetonate were then added, and 898.5 parts of toluylene diisocyanate were added dropwise slowly at 60° C. and reacted until the —N═C═O content was <0.5. 10 parts of KOH, dissolved in 20 parts of methanol, were then added dropwise and 509.4 parts of 2-ethylhexyl cyanoacetate were then added at 60° C. and the mixture was kept at 60° C. until the content of —C═C— double bonds was 4%. The product was then diluted with n-hexyleneglycol to a strength of 80%. A highly viscous, green solution was obtained.

(21) 228 parts of ε-caprolactone, 230 parts of hydroxyethyl acrylate, 1 part of sodium methylate, 1 part of magnesium methylate and 5 parts of hydroquinone monomethyl ether were heated to 80° C. in a reactor and were kept at 80° C. until the content of free ε-caprolactone was <5%. 174 parts of toluylene diisocyanate were then added dropwise slowly at 60° C. and the mixture was kept at this temperature until the —N═C═O content was <0.5%. 80 parts of 2-ethylhexyl cyanoacetate were then added dropwise and the mixture was kept at 60° C. until the content of —C═C— double bonds was 3.2%. The product was then diluted with phenoxypropanol to a strength of 80%. A clear, very highly viscous solution was obtained.

Preparation of the cataphoresis baths

A 70% solution of the eooxide-amine adduct A was heated to 100° C. and the solvent was distilled off in vacuo as completely as possible, the curing agent solution from Example 20 was then added at 80° C. and the mixture was homogenized (ratio of epoxide-amine adduct to curing agent 75:25 on solid/solid basis) and lead octoate was added so that 0.6% of Pb was present relative to total solids, and the mixture was then poured, of 20% with water, and deposition was carried out in a deposition apparatus equipped with sheet iron as cathode and a stainless steel anode, at a bath temperature of 28° C. (deposition time 2 minutes, voltage 250 volts at an electrode distance of 10 cm). The film was then stoved at 150° C. for 20 minutes. A uniform film 37 μm thick, having good mechanical and anti-corrosion properties was obtained.

The same procedure was used with the curing agent from Example 21. This film was stoved at 160° C. for 20 minutes. It was approx. 40 μm thick and also had excellent mechanical and anti-corrosion properties.

I claim:

1. In a process for curing synthetic resins containing groups capable of ester formation and/or amide formation with carboxylic acids, the improvement comprising using as the curing agent a compound composed of the Michael addition product of (a) a monocarboxylic or dicarboxylic acid ester capable of undergoing Michael addition with (b) a compound containing at least two double bonds capable of undergoing Michael addition selected from the group consisting of (i) an ester of an α,β-unsaturated monocarboxylic or dicarboxylic acid with a polyol, (ii) an amide of the formula $R_n(A—Ac)_n$(III) in which $R_n$ is the radical of a polyamine, A is an amino group and Ac is the acyl radical of an α,β-unsaturated monocarboxylic or dicarboxylic acid and n is an integer of at least 2 and (III) an urea or urethane derivative of an α,β-unsaturated monocarboxylic or dicarboxylic acid, and which, on average, contains per molecule, at least one polymerizable double bond and at least one ester group capable of transesterification and/or transamidation.

2. The method of claim 1 wherein the acid ester (a) is selected from the group consisting of an ester of malonic acid, acetoacetic acid, cyanoacetic acid, acetone dicarboxylic acid, or a derivative of these acids which is optionally monosubstituted by an alkyl radical on the acid methylene group, and in which the alcoholic component contains 1 to 8 carbon atoms.

3. The method of claim 1 wherein the carboxylic acid ester (a) is a methyl, ethyl, butyl or 2-ethylhexyl ester.

4. The method of claim 1 wherein the compound (i) belongs to the group consisting of an alkanediol diacrylate or dimethylacrylate, trimethylolpropane triacrylate or trimethacrylic and pentaerythritol tetraacrylate or tetramethacrylate.

5. The method of claim 1 wherein the compound (i) consists of a mixed ester formed from an $\alpha,\beta$-unsaturated dicarboxylic acid, a diol and the glycerol ester of a carboxylic acid which has 9 to 11 carbon atoms and is branched in the $\alpha$-position.

6. The method of claim 1 wherein in the compounds (i) to (iii), the $\alpha,\beta$-unsaturated monocarboxylic or dicarboxylic acid is selected of the group consisting of acrylic acid, methacrylic acid, dimethacrylic acid, crotonic acid, maleic acid and fumaric acid.

7. The method of claim 1 wherein the compound (ii) is selected of the group consisting of methylene bisacrylamide, toulylene bisacrylamide, hexamethylene bisacrylamide and isophorone bisacrylamide.

8. The method of claim 1 wherein the compound (iii) is obtained by reacting hydroxy esters, hydroxy amides, amides, aminoesters or aminoamides of $\alpha,\beta$-unsaturated monocarboxylic or dicarboxylic acids of the group consisting of acrylic acid, methacrylic acid, dimethacrylic acid, crotonic acid, maleic acid and fumaric acid with isocyanates.

9. The method of claim 1 wherein the Michael addition product is a substituted urethane or a substituted urea of the formula

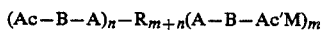

in which
$R_{m+n}$ is the (m+n)-valent radical of a polyfunctional isocyanate $R(NHCO)_{m+n}$,
m is an integer of at least 1,
n is an integer of at least 1,
A denotes a chemical bond or an aminoalkylene, O-alkylene, aminocycloalkylene or O-cycloalkylene,
B is amino or oxygen,
Ac is acyl of an $\alpha,\beta$-unsaturated monocarboxylic or dicarboxylic acid,
Ac' is the same as —Ac, the residue Ac', however, not being unsaturated due to the Michael addition of M, and,
M denotes the ester of a monocarboxylic or dicarboxylic acid which has undergone an addition reaction with the molecule by means of Michael addition,
subject to the proviso that the molecule contains at least one polymerizable double bond and at least one ester group from the carboxylic acid ester (M) which is capable of undergoing Michael addition, and that B is an amino group when A is a chemical bond.

10. The method of claim 9 wherein m and n are integers from 1 to 4.

11. The method of claim 9 wherein A in formula (I) is

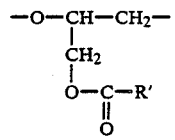

in which R' is alkyl of 9 to 11 carbon atoms and is branched in the $\alpha$-position relative to the carboxyl group and B is oxygen.

12. The method of claim 9 wherein A in formula (I) is derived from a 1,2-diol having at least 5 carbon atoms in an unbranched chain, and B is oxygen.

13. The method of claim 9 wherein A in formula (I) is

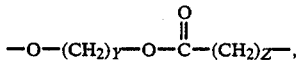

B is oxygen, Y is an integer and Z is an integer of at least 5.

14. The method of claim 13 wherein Y is Z.

15. A curable mixture comprising (A) a resin containing hydroxyl or amino groups and having a molecular-weight of about 300 to about 20,000 and (B) a cross-linking agent which is the Michael addition product of a monocarboxylic or dicarboxylic acid ester, capable of undergoing Michael addition, with a compound containing at least two double bonds capable of undergoing Michael addition, and which, on average, contains, per molecule at least one polymerizable double bond and at least one ester group capable of transesterification and/or transamidation.

16. A mixture of claim 15 wherein components (A) and (B) are in such proportions that the ratio of the total number of moles of groups capable of ester formation and amide formation in the synthetic resin to the total number of moles of double bonds and groups capable of transesterification and transamidation in the curing agent is 0.1 to 10.

17. A mixture of claim 15 also containing a catalyst in the form of a metal salt of an organic acid selected from the group consisting of zinc, lead, iron and chromium octoate and zinc, lead, iron or chromium naphthenate in an amount up to 10% by weight calculated as amount of metal and relative to the total weight of the synthetic resin and the curing agent.

18. A heat curable mixture comprising (A) an organic resin containing a plurality of hydroxy groups, primary or secondary amino groups or a combination thereof, and (B) a cross-linking agent which is the Michael addition product of a monocarboxylic or dicarboxylic acid ester possessing acid methylene groups or acid methylene groups substituted by an alkyl radical, said ester being capable of undergoing Michael addition, with a compound containing at least two ethylenic double bonds capable of undergoing Michael addition, the cross-linking agent, on average, contains, per molecule, at least one polymerization double bond and at least two ester groups capable of transesterification or transamidation.

* * * * *